United States Patent
Karaki et al.

(10) Patent No.: US 12,127,211 B2
(45) Date of Patent: *Oct. 22, 2024

(54) TIME RESOURCES FOR NEW RADIO CONFIGURED UPLINK (UL)

(71) Applicant: Telefonaktiebolaget LM Ericsson (publ), Stockholm (SE)

(72) Inventors: Reem Karaki, Aachen (DE); Havish Koorapaty, Saratoga, CA (US); Min Wang, Luleå (SE); Jung-Fu Cheng, Fremont, CA (US); Yufei Blankenship, Kildeer, IL (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 441 days.

This patent is subject to a terminal disclaimer.

(21) Appl. No.: 17/427,817

(22) PCT Filed: Feb. 11, 2020

(86) PCT No.: PCT/EP2020/053495
§ 371 (c)(1),
(2) Date: Aug. 2, 2021

(87) PCT Pub. No.: WO2020/165183
PCT Pub. Date: Aug. 20, 2020

(65) Prior Publication Data
US 2022/0141864 A1     May 5, 2022

Related U.S. Application Data

(60) Provisional application No. 62/806,615, filed on Feb. 15, 2019.

(51) Int. Cl.
*H04W 4/00*     (2018.01)
*H04W 72/0446*     (2023.01)
(Continued)

(52) U.S. Cl.
CPC ....... *H04W 72/23* (2023.01); *H04W 72/0446* (2013.01); *H04W 72/1268* (2013.01)

(58) Field of Classification Search
CPC ............. H04W 72/23; H04W 72/0446; H04W 72/1268
(Continued)

(56) References Cited

U.S. PATENT DOCUMENTS 10,959,260 B2 * 3/2021 Karaki ............. H04W 72/1268
2018/0077643 A1 3/2018 Dinan
(Continued)

FOREIGN PATENT DOCUMENTS

CN     108353417 A     7/2018
WO     2018128970 A1     7/2018
(Continued)

OTHER PUBLICATIONS

International Search Report and Written Opinion dated Apr. 28, 2020 for International Application No. PCT/EP2020/053495 filed on Feb. 11, 2020, consisting of 11-pages.
(Continued)

*Primary Examiner* — Chuong T Ho
(74) *Attorney, Agent, or Firm* — Weisberg I.P. Law, P.A.

(57) ABSTRACT

A method and apparatus are disclosed for time resources for NRU configured UL. In one embodiment, a network node is configured to configure a wireless device (WD) with at least one configured grant, CG, uplink transmission configuration; and receive signaling based at least in part on the at least one CG uplink transmission configuration. In one embodiment, a wireless device (WD) is configured to obtain at least one configured grant, CG, uplink transmission configuration; and transmit signaling based at least in part on the obtained at least one CG uplink transmission configuration.

19 Claims, 15 Drawing Sheets

(51) Int. Cl.
*H04W 72/1268* (2023.01)
*H04W 72/23* (2023.01)

(58) Field of Classification Search
USPC .................................. 370/329, 330, 328
See application file for complete search history.

(56) References Cited

U.S. PATENT DOCUMENTS

| | | | | |
|---|---|---|---|---|
| 2019/0349983 | A1* | 11/2019 | Loehr | H04W 52/242 |
| 2020/0221310 | A1* | 7/2020 | Babaei | H04W 72/0466 |
| 2020/0245335 | A1* | 7/2020 | Joseph | H04W 72/56 |
| 2020/0267712 | A1* | 8/2020 | Cirik | H04L 5/0023 |
| 2020/0359409 | A1* | 11/2020 | Karaki | H04W 72/23 |
| 2020/0389916 | A1* | 12/2020 | Salem | H04W 74/006 |
| 2021/0314982 | A1* | 10/2021 | Panteleev | H04L 5/0053 |

FOREIGN PATENT DOCUMENTS

| | | | |
|---|---|---|---|
| WO | 2018171927 | A1 | 9/2018 |
| WO | 2020033785 | A1 | 2/2020 |
| WO | 2020065870 | A1 | 2/2020 |

OTHER PUBLICATIONS

3GPP TSG RAN WG2 #101 NR Tdoc R2-1803164; Title: Confirmation of Configured Grant Activation for Multiple Aggregated Cells; Agenda Item: 10.3.1.8; Source: Ericsson; Document for: Discussion, Decision, Location and Date: Athens, Greece, Feb. 26-Mar. 2, 2018, Consisting of 6-pages.

3GPP TSG RAN WG1 Ad-Hoc Meeting 1901 R1-1901330; Title: Summary of 7.2.6.3 Enhanced configured grant PUSCH transmissions; Agenda Item: 7.2.6.3; Source: NTT Docomo, Inc.; Document for: Discussion and decision, Location and Date: Taipei, Jan. 21-25, 2019, Consisting of 53-pages.

3GPP TSG-RAN WG2 #105 TDoc R2-1901675; Title: On Autonomous UL Transmissions for NR-U; Agenda Item: 11.2.1.2; Source: Ericsson; Document for: Discussion, Decision, Location and Date: Athens, Greece, Feb. 25-Mar. 1, 2019, Consisting of 4-pages.

3GPP TS 38.321 V15.1.0; 3rd Generation Partnership Project; Technical Specification Group Radio Access Network; NR; Medium Access Control (MAC) protocol specification (Release 15); Mar. 2018; consisting of 67 pages.

3GPP TS 38.211 V15.1.0; 3rd Generation Partnership Project; Technical Specification Group Radio Access Network: NR; Physical channels and modulation (Release 15); Mar. 2018; consisting of 90 pages.

Japanese Office Action and English Translation dated Oct. 18, 2022 for Application No. 2021-546877, consisting of 8 pages.

3GPP TS 36.321 V15.4.0 "3rd Generation Partnership Project; Technical Specification Group Radio Access Network; Evolved Universal Terrestrial Radio Access (E-UTRA); Medium Access Control (MAC) protocol specification (Release 15)"; Dec. 2018, consisting of 131 pages.

3GPP TSG RAN WG1 NR Ad-Hoc Meeting 1901 R1-1900866; Title: Detailed design on multiple active configurations for configured grant transmission; Agenda Item: 7.2.6.4; Source: Huawei, HiSilicon; Document for: Discussion and Decision; Location and Date: Taipei, Jan. 21-25, 2019, consisting of 4 pages.

3GPP TSG RAN WG1 Meeting #92 R1-1801786; Title: Summary of remaining issues on UL data transmission procedure; Agenda Item: 7.1.3.3.4; Source: Huawei, HiSilicon; Document for: Discussion and decision; Location and Date: Athens Greece, Feb. 26-Mar. 2, 2018, consisting of 8 pages.

3GPP TSG RAN WG1 Ad-Hoc Meeting 1901 R1-1901306; Title: On Configured Grant enhancements for NR URLLC; Agenda item: 7.2.6.3; Source: Nokia, Nokia Shanghai Bell; Document for: Discussion and Decision; Location and Date: Taipei, Taiwan, Jan. 21-25, 2019, consisting of 12 pages.

Chinese Office Action and English Summary dated Oct. 21, 2023 for Application No. 202080014531.X, consisting of 16 pages.

European Search Report dated Jan. 4, 2024 for Application No. 20705159.0, consisting of 7 pages.

* cited by examiner

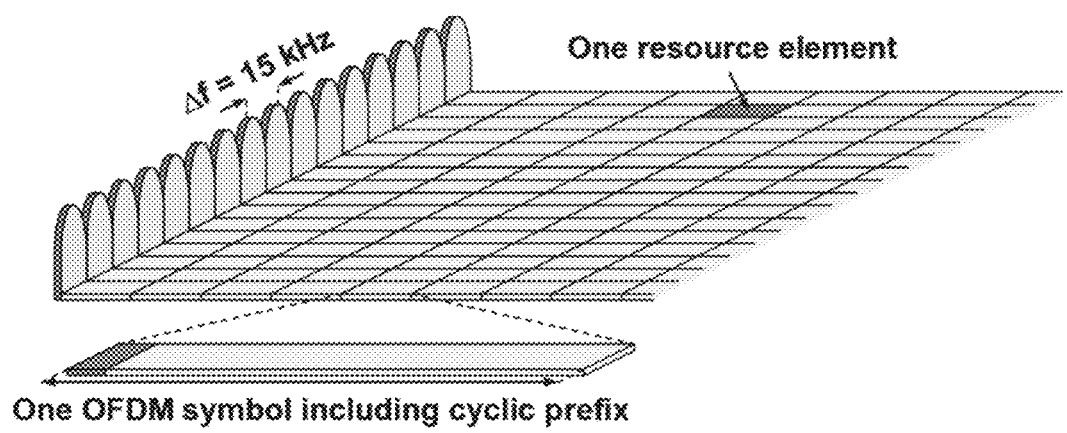
FIG. 1 – Prior Art

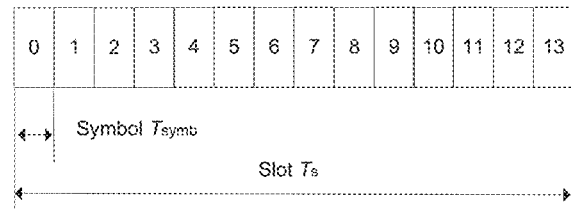
FIG. 2 – Prior Art
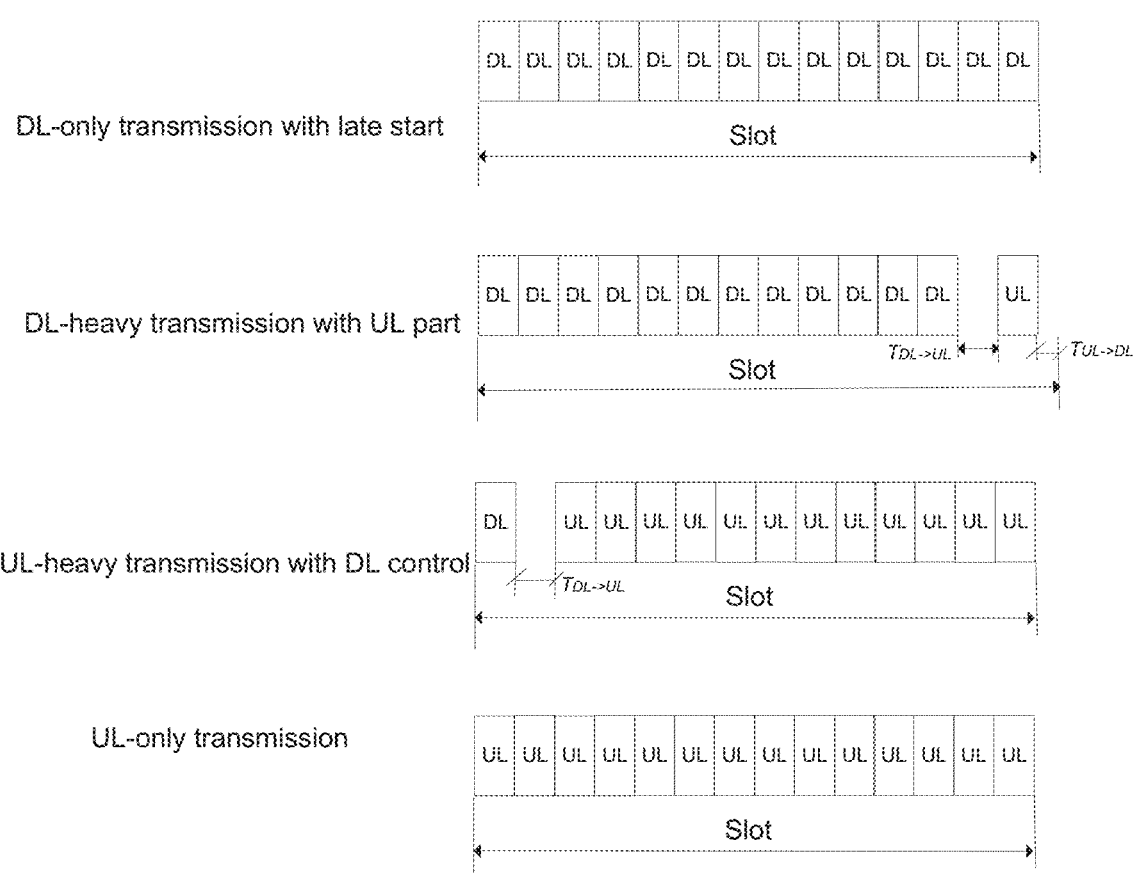
FIG. 3

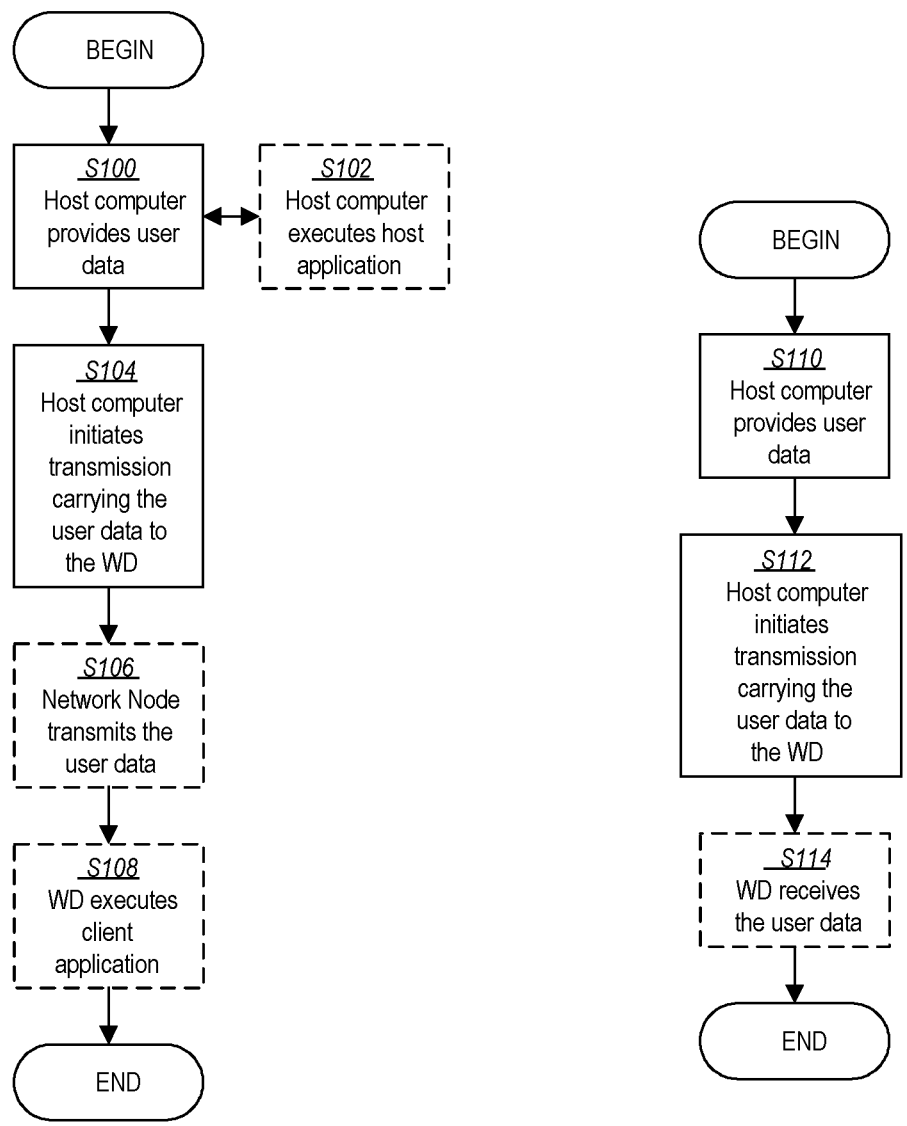

TIME RESOURCES FOR NEW RADIO CONFIGURED UPLINK (UL)

CROSS-REFERENCE TO RELATED APPLICATIONS

This application is a Submission Under 35 U.S.C. § 371 for U.S. National Stage Patent Application of International Application No.: PCT/EP2020/053495, filed Feb. 11, 2020 entitled "TIME RESOURCES FOR NEW RADIO CONFIGURED UPLINK (UL)," which claims priority to U.S. Provisional Application No. 62/806,615, filed Feb. 15, 2019, entitled "TIME RESOURCES FOR NRU CONFIGURED UL," the entireties of both of which are incorporated herein by reference.

TECHNICAL FIELD

The present disclosure relates to wireless communications, and in particular, to time resources for New Radio (NR) configured uplink (UL) communications.

BACKGROUND

The new radio (NR) (also known as "5G") standard in the 3rd Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 orthogonal frequency division multiplexed (OFDM) symbols. It should be noted that the concepts of slot and mini-slot are not specific to a specific service meaning that a mini-slot may be used for either eMBB, URLLC, or other services.

Resource Blocks

In 3GPP Release 15 (Rel-15) NR, a wireless device (WD), such as a user equipment (UE), can be configured with up to four carrier bandwidth parts in the downlink with a single downlink carrier bandwidth part being active at a given time. A WD can be configured with up to four carrier bandwidth parts (BWP) in the uplink with a single uplink carrier bandwidth part being active at a given time. If a WD is configured with a supplementary uplink, the WD can in addition be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain.

Numerologies

Multiple OFDM numerologies, $\mu$, are supported in NR as given by Table 1, for example, where the subcarrier spacing, $\Delta f$, and the cyclic prefix for a carrier bandwidth part are configured by different higher layer parameters for downlink and uplink, respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. Downlink physical channels may include:
Physical Downlink Shared Channel, PDSCH;
Physical Broadcast Channel, PBCH; and
Physical Downlink Control Channel, PDCCH.

PDSCH is the main physical channel used for unicast downlink data transmission, but also for transmission of random access response (RAR), certain system information blocks, and paging information. PBCH carries the basic system information, required by the WD to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. Uplink physical channels may include:
Physical Uplink Shared Channel, PUSCH;
Physical Uplink Control Channel, PUCCH; and
Physical Random Access Channel, PRACH.

PUSCH is the uplink counterpart to the PDSCH. PUCCH is used by WDs to transmit uplink control information, including HARQ acknowledgements, channel state information reports, etc. PRACH is used for random access preamble transmission.

Frequency Resource Allocation for PUSCH and PDSCH

In general, a WD determines the RB assignment in the frequency domain for PUSCH or PDSCH using the resource allocation field in the detected DCI carried in PDCCH. For PUSCH carrying msg3 in a random-access procedure, the frequency domain resource assignment is signaled by using the uplink (UL) grant contained in RAR.

In NR, two frequency resource allocation schemes, type 0 and type 1, are supported for PUSCH and PDSCH. Which type to use for a PUSCH/PDSCH transmission may be either defined by a radio resource control (RRC) configured parameter or indicated directly in the corresponding DCI or UL grant in RAR (for which type 1 is used).

The RB indexing for uplink/downlink type 0 and type 1 resource allocation may be determined within the WD's active carrier bandwidth part, and the WD may upon detection of PDCCH intended for the WD determine first the uplink/downlink carrier bandwidth part and then the resource allocation within the carrier bandwidth part. The UL BWP for PUSCH carrying msg3 is configured by higher layer parameters.

Cell Search and Initial Access Related Channels and Signals

For cell search and initial access, these channels may be included: Synchronization Signal/Physical Broadcast Channel (SS/PBCH) block, PDSCH carrying RMSI/RAR/MSG4 scheduled by the PDCCH channels carrying DCI, PRACH channels and PUSCH channel carrying MSG3.

Synchronization signal and PBCH block (SS/PBCH block, or SSB in shorter format) includes the following signals (Primary Synchronization Signal (PSS), Secondary Synchronization Signal (SSS) and PBCH Demodulation Reference Signal (DMRS)), and PBCH. SSB may have 15 kHz, 30 kHz, 120 kHz or 240 kHz subcarrier spacing (SCS) depending on the frequency range.

PDCCH Monitoring

In 3GPP NR standard, downlink control information (DCI) is received over the physical layer downlink control channel (PDCCH). The PDCCH may carry DCI in messages with different formats. DCI format 0_0 and 0_1 are DCI messages used to convey uplink grants to the WD for transmission of the physical layer data channel in the uplink (PUSCH) and DCI format 1_0 and 1_1 are used to convey downlink grants for transmission of the physical layer data channel on the downlink (PDSCH). Other DCI formats (2_0, 2_1, 2_2 and 2_3) may be used for other purposes such as transmission of slot format information, reserved resource, transmit power control information etc.

A PDCCH candidate is searched within a common or WD-specific search space which is mapped to a set of time and frequency resources referred to as a control resource set (CORESET). The search spaces within which PDCCH candidates must be monitored are configured to the WD via radio resource control (RRC) signaling. A monitoring periodicity is also configured for different PDCCH candidates. In any particular slot, the WD may be configured to monitor multiple PDCCH candidates in multiple search spaces which may be mapped to one or more CORESETs. PDCCH candidates may need to be monitored multiple times in a slot, once every slot or once in multiple of slots.

The smallest unit used for defining CORESETs is a Resource Element Group (REG) which is defined as spanning 1 PRB×1 OFDM symbol in frequency and time. Each REG contains demodulation reference signals (DM-RS) to aid in the estimation of the radio channel over which that REG was transmitted. When transmitting the PDCCH, a precoder could be used to apply weights at the transmit antennas based on some knowledge of the radio channel prior to transmission. It may be possible to improve channel estimation performance at the WD by estimating the channel over multiple REGs that are proximate in time and frequency if the precoder used at the transmitter for the REGs is not different. To assist the WD with channel estimation the multiple REGs can be grouped together to form a REG bundle and the REG bundle size for a CORESET is indicated to the WD. The WD may assume that any precoder used for the transmission of the PDCCH is the same for all the REGs in the REG bundle. A REG bundle may include 2, 3 or 6 REGs.

A control channel element (CCE) includes 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

Interleaving can provide frequency diversity. Not using interleaving may be beneficial for cases where knowledge of the channel allows the use of a precoder in a particular part of the spectrum to improve the signal-to-interference-plus-noise ratio (SINR) at the receiver.

A PDCCH candidate may span 1, 2, 4, 8 or 16 CCEs. If more than one CCE is used, the information in the first CCE is repeated in the other CCEs. Therefore, the number of aggregated CCEs used is referred to as the aggregation level (AL) for the PDCCH candidate.

A hashing function may be used to determine the CCEs corresponding to PDCCH candidates that a WD must monitor within a search space set. The hashing may be performed differently for different WDs so that the CCEs used by the WDs are randomized and the probability of collisions between multiple WDs for which PDCCH messages are included in a CORESET is reduced.

Slot Structure

An NR slot includes several OFDM symbols, according to current agreements either 7 or 14 symbols (OFDM subcarrier spacing ≤60 kHz) and 14 symbols (OFDM subcarrier spacing >60 kHz). FIG. 1 shows a subframe with 14 OFDM symbols. In FIG. 2, $T_s$ and $T_{symb}$ denote the slot and OFDM symbol duration, respectively.

In addition, a slot may also be shortened to accommodate DL/UL transient period or both DL and UL transmissions. Potential variations are shown in FIG. 3 as examples.

Furthermore, NR also defines Type B scheduling, also known as mini-slots. Mini-slots are shorter than slots (according to current agreements from 1 or 2 symbols up to number of symbols in a slot minus one) and can start at any symbol. Mini-slots may be used if the transmission duration of a slot is too long or the occurrence of the next slot start (slot alignment) is too late. Applications of mini-slots include among others latency critical transmissions (in this case both mini-slot length and frequent opportunity of mini-slot may be considered relevant) and unlicensed spectrum where a transmission should start immediately after listen-before-talk (LBT) succeeded (here the frequent opportunity of mini-slot may be considered especially relevant). An example of mini-slots is shown in FIG. 4, where the shading indicates the time resources for a mini-slot.

Configured UL

NR supports two types of pre-configured resources, both of which are different flavors of existing Long Term Evolution (LTE) semi-persistent scheduling (SPS) with some further aspects such as supporting repetitions for a transport block (TB):

Type 1, UL data transmission with configured grant is only based on RRC (re)configuration without any L1 signaling.

Type 2 is very similar to LTE SPS feature. UL data transmission with configured grant is based on both RRC configuration and L1 signaling for activation/deactivation of the grant. The network node (e.g., gNB) may explicitly activate the configured resources on PDCCH and the WD confirms the reception of the activation/deactivation grant with a Medium Access Control (MAC) control element (CE).

Repetition of a TB may also be supported in NR, and the same resource configuration is used for K repetitions for a TB including the initial transmission. The possible values of K are {1, 2, 4, 8}. Repetitions follow a redundancy version (RV) sequence configured by WD-specific RRC signaling to one of the following: Sequence {0, 2, 3, 1} or {0, 3, 0, 3} or {0, 0, 0, 0}.

HARQ Process Identifier (ID) Calculation for Configured UL

When a WD determines to transmit data using a configured grant, a WD may further determine the HARQ process ID associated with the configured grant according to e.g., Section 5.4.1 of 3GPP Technical Specification (TS) 38.321410. The corresponding part is presented below for reference:

"Once a [WD] transmits data using a configured grant, the [WD] should also determine the HARQ process ID associated with the configured grant according to the defined formula in Section 5.4.1 in 3GPP TS 38.321-f10."

The corresponding part is copied below for quick reference:

"For configured uplink grants, the HARQ Process ID associated with the first symbol of a UL transmission is derived from the following equation: HARQ Process ID=[floor(CURRENT_symbol/periodicity)] modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211.

NOTE 1: CURRENT_symbol refers to the symbol index of the first transmission occasion of a repetition bundle that takes place.

NOTE 2: A HARQ process is configured for a configured grant if the configured grant is activated and the associated HARQ process ID is less than nrofHARQ-Processes."

Operation in Unlicensed Spectrum

For a node to be allowed to transmit in unlicensed spectrum, e.g., the 5 GHz band, the node typically performs a clear channel assessment (CCA). This procedure typically includes sensing the medium to be idle for a number of time intervals. Sensing the medium to be idle can be performed in different ways, e.g., using energy detection, preamble detection or using virtual carrier sensing (where the latter implies that the node reads control information from other transmitting nodes informing when a transmission ends). After sensing the medium idle, a node is typically allowed to transmit for a certain amount of time, sometimes referred to as transmission opportunity (TXOP). The length of the TXOP depends on regulation and type of CCA that has been performed, but typically ranges from 1 millisecond (ms) to 10 ms.

The mini-slot concept in NR allows a node to access the channel at a much finer granularity compared to e.g., LTE License-Assisted Access (LAA), where the channel could only be accessed at 500 us intervals. Using for example 60 kHz subcarrier-spacing and a two symbol mini-slot in NR, the channel can be accessed at 36 us intervals.

SUMMARY

Some embodiments advantageously provide methods and apparatuses for time resources for NRU configured UL.

In one embodiment, a network node is configured to configure a wireless device (WD) with configured grant (CG) time resources based at least in part on CG periodicity and a bitmap, the bitmap indicating which time resources are allowed for uplink transmissions from the WD; and receive the uplink transmissions from the WD on at least part of the allowed time resources.

In another embodiment, a wireless device (WD) is configured to obtain a configuration of configured grant (CG) time resources based at least in part on CG periodicity and a bitmap, the bitmap indicating which time resources are allowed for uplink transmissions from the WD; and transmit the uplink transmissions on at least part of the allowed time resources.

According to one aspect of the present disclosure, a method implemented in a wireless device, WD, configured to communicate with a network node is provided. The method includes obtaining at least one configured grant, CG, uplink transmission configuration; and transmitting signaling based at least in part on the obtained at least one CG uplink transmission configuration.

In some embodiments of this aspect, obtaining the at least one CG uplink transmission configuration includes obtaining multiple CG uplink transmission configurations via radio resource control, RRC, signaling. In some embodiments of this aspect, the method further includes receiving one of an activation and a deactivation of at least one of the at least one CG uplink transmission configuration; and transmitting, via a medium access control, MAC, control element, CE, a bitmap, the bitmap indicating confirmation of the one of the activation and the deactivation of each of the at least one CG uplink transmission configuration. In some embodiments of this aspect, each of the at least one CG uplink transmission configuration corresponds to a bit in the bitmap. In some embodiments of this aspect, obtaining the at least one CG uplink transmission configuration further includes receiving an assignment of an index for each of the at least one CG uplink transmission configuration via radio resource control, RRC, signaling.

In some embodiments of this aspect, the method further includes receiving a slot format information, SFI, the SFI indicating at least one time resource as flexible, the at least one time resource indicated as flexible being allowed for an uplink transmission corresponding to the at least one CG uplink transmission configuration. In some embodiments of this aspect, the method further includes receiving signaling instructing the WD to, after transmitting uplink according to a first configuration of the at least one CG uplink transmission configuration, switch to a second configuration of the at least one CG uplink transmission configuration, different from the first configuration of the at least one CG uplink transmission configuration; and switching between the first and second configurations of the at least one CG uplink transmission configuration according to the received instruction.

According to another aspect of the present disclosure, a method implemented in a network node configured to communicate with a wireless device, WD, is provided. The method includes configuring the WD with at least one configured grant, CG, uplink transmission configuration; and receiving signaling based at least in part on the at least one CG uplink transmission configuration.

In some embodiments of this aspect, configuring the WD with the at least one CG uplink transmission configuration includes configuring the WD with multiple CG uplink transmission configurations via radio resource control, RRC, signaling. In some embodiments of this aspect, the method further includes one of activating and deactivating at least one of the at least one CG uplink transmission configuration; and receiving, via a medium access control, MAC, control element, CE, a bitmap, the bitmap indicating confirmation of the one of the activating and the deactivating of each of the at least one CG uplink transmission configuration.

In some embodiments of this aspect, each of the at least one CG uplink transmission configuration corresponds to a bit in the bitmap. In some embodiments of this aspect, configuring the WD with the at least one CG uplink transmission configuration further includes assigning an index for each of the at least one CG uplink transmission configuration via radio resource control, RRC, signaling. In some embodiments of this aspect, the method further includes transmitting a slot format information, SFI, the SFI indicating at least one time resource as flexible, the at least one time resource indicated as flexible being allowed for an uplink transmission corresponding to the at least one CG uplink transmission configuration.

In some embodiments of this aspect, the method further includes transmitting signaling instructing the WD to, after transmitting uplink according to a first configuration of the at least one CG uplink transmission configuration, switch to a second configuration of the at least one CG uplink transmission configuration, different from the first configuration of the at least one CG uplink transmission configuration.

According to another aspect of the present disclosure, a wireless device, WD, configured to communicate with a network node is provided. The wireless device comprising processing circuitry configured to cause the wireless device to obtain at least one configured grant, CG, uplink transmission configuration; and transmit signaling based at least in part on the obtained at least one CG uplink transmission configuration.

In some embodiments of this aspect, the processing circuitry is configured to cause the wireless device to obtain the at least one CG uplink transmission configuration by being configured to cause the wireless device to obtain multiple CG uplink transmission configurations via radio resource control, RRC, signaling. In some embodiments of this aspect, the processing circuitry is further configured to cause the wireless device to receive one of an activation and a deactivation of at least one of the at least one CG uplink transmission configuration; and transmit, via a medium access control, MAC, control element, CE, a bitmap, the bitmap indicating confirmation of the one of the activation and the deactivation of each of the at least one CG uplink transmission configuration.

In some embodiments of this aspect, each of the at least one CG uplink transmission configuration corresponds to a bit in the bitmap. In some embodiments of this aspect, the processing circuitry is further configured to cause the wireless device to obtain the at least one CG uplink transmission configuration by being configured to cause the wireless device to receive an assignment of an index for each of the at least one CG uplink transmission configuration via radio resource control, RRC, signaling. In some embodiments of this aspect, the processing circuitry is further configured to cause the wireless device to receive a slot format information, SFI, the SFI indicating at least one time resource as flexible, the at least one time resource indicated as flexible being allowed for an uplink transmission corresponding to the at least one CG uplink transmission configuration.

In some embodiments of this aspect, the processing circuitry is further configured to cause the wireless device to receive signaling instructing the WD to, after transmitting uplink according to a first configuration of the at least one CG uplink transmission configuration, switch to a second configuration of the at least one CG uplink transmission configuration, different from the first configuration of the at least one CG uplink transmission configuration; and switch between the first and second configurations of the at least one CG uplink transmission configuration according to the received instruction.

According to another aspect of the present disclosure, a network node configured to communicate with a wireless device, WD, is provided. The network node includes processing circuitry. The processing circuitry is configured to cause the network node to perform any one or more of the methods above performed by the network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 illustrates an exemplary radio resource in NR;
FIG. 2 illustrates an exemplary radio resource in NR;
FIG. 3 illustrates an example of slot variations;
FIG. 7 is a flowchart illustrating exemplary methods implemented in a communication system including a host computer, a network node and a wireless device for executing a client application at a wireless device according to some embodiments of the present disclosure;
FIG. 8 is a flowchart illustrating exemplary methods implemented in a communication system including a host computer, a network node and a wireless device for receiving user data at a wireless device according to some embodiments of the present disclosure.

DETAILED DESCRIPTION

Figure 4:
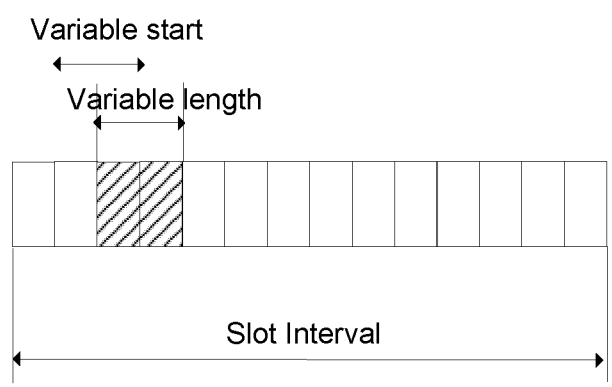
FIG. 4 illustrates mini-slot with 2 OFDM symbols.

The present disclosure provides techniques for indicating and assigning time resources for configured UL WDs. In some embodiments, the techniques may be performed on an unlicensed spectrum. At least some of the techniques described herein may provide for enhanced UL operation on the unlicensed spectrum using a configured UL. In other embodiments, the techniques may be performed on a licensed spectrum.

For both Type 1 and Type 2, configured UL periodicity may be higher layer configured through RRC signaling.

The following periodicities are supported depending on the configured subcarrier spacing [symbols]:
 a) 15 kHz: 2, 7, n*14, where n={1, 2, 4, 5, 8, 10, 16, 20, 32, 40, 64, 80, 128, 160, 320, 640}
 b) 30 kHz: 2, 7, n*14, where n={1, 2, 4, 5, 8, 10, 16, 20, 32, 40, 64, 80, 128, 160, 256, 320, 640, 1280}
 c) 60 kHz with normal cyclic prefix (CP): 2, 7, n*14, where n={1, 2, 4, 5, 8, 10, 16, 20, 32, 40, 64, 80, 128, 160, 256, 320, 512, 640, 1280, 2560}
 d) 60 kHz with ECP: 2, 6, n*12, where n={1, 2, 4, 5, 8, 10, 16, 20, 32, 40, 64, 80, 128, 160, 256, 320, 512, 640, 1280, 2560}

For Type 1 configured grants (CGs), the time resources are configured via RRC signaling:
 timeDomainAllocation: Allocation of configured uplink grant in time domain which contains startSymbolAndLength (which gives S as the starting symbol and L as the length (in symbols) of the PUSCH)
 timeDomainOffset: Offset of a resource with respect to System Frame Number (SFN)=0 in the time domain After an uplink grant is configured for a configured grant Type 1, the MAC entity considers sequentially that the Nth uplink grant occurs associated with the symbol for which:

[(SFN×numberOfSlotsPerFrame×numberOfSymbolsPerSlot)+(slot number in the frame×numberOfSymbolsPerSlot)+symbol number in the slot]=(timeDomainOffset×numberOfSymbolsPerSlot+$S$+$N$×periodicity)modulo(1024×numberOfSlotsPerFrame×numberOfSymbolsPerSlot).

where S is the starting symbol given by timeDomainAllocation.

After an uplink grant is configured for a configured grant (CG) Type 2, the MAC entity considers sequentially that the Nth uplink grant occurs associated with the symbol for which:

[(SFN×numberOfSlotsPerFrame×numberOfSymbolsPerSlot)+(slot number in the frame×numberOfSymbolsPerSlot)+symbol number in the slot]=[SFN$_{start\ time}$×numberOfSlotsPerFrame×numberOfSymbolsPerSlot+slot$_{start\ time}$×numberOfSymbolsPerSlot+symbol$_{start\ time}$+$N$×periodicity]modulo(1024×numberOfSlotsPerFrame×numberOfSymbolsPerSlot), where SFN$_{start\ time}$, slot$_{start\ time}$, and symbol$_{start\ time}$ are the SFN, slot, and symbol, respectively, of the first transmission of PUSCH where the configured uplink grant was (re-)initialised.

For example, assuming 30 KHz subcarrier spacing, to configure UL resources on consecutive slots, a WD may be configured with either the following:
 Periodicity 2, S=0, L=2;
 Periodicity 7, S=0, L=7; and
 Periodicity 14, S=0, L=14,
where S is the starting symbol and L is the length (in symbols) of the PUSCH.

All three configurations may allow a WD to transmit configured UL in any slot, but the number of lengths of PUSCH(s) within a slot may differ from one to another. Configurations similar to the listed ones may be considered the most suitable for unlicensed operation because it permits UL transmission on consecutive slots without gaps in between.

However, it may be very restrictive if the only way to efficiently use configured UL on unlicensed channel is by allowing the WD to transmit in every slot. The network node (e.g., gNB) should have some flexibility in assigning or excluding certain slots for configured UL.

Besides, timeDomainAllocation may be applied to every configured UL slot, which means that even if the WD is configured with slot periodicity of 1, the S and L should be set in a way in which no gaps are introduced between consecutive UL slots within an UL burst.

Accordingly, the present disclosure provides techniques for indicating and assigning time resources for configured UL WDs on an unlicensed spectrum as well as on a licensed spectrum. At least some of the techniques may provide for enhanced UL operation on the unlicensed spectrum using configured UL, as well as on a licensed spectrum.

Before describing in detail exemplary embodiments, it is noted that the embodiments reside primarily in combinations of apparatus components and processing steps related to time resources for NR configured UL. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Configuring a terminal or wireless device (WD) or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device (e.g., the indication of the resource allocation as discussed above). Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

The term time resource used herein may correspond to any type of physical resource or radio resource expressed in terms of length of time. Examples of time resources are: symbol, time slot, mini-slot, subframe, radio frame, transmission time interval (TTI), interleaving time, etc.

Any two or more embodiments described in this disclosure may be combined in any way with each other.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 5:
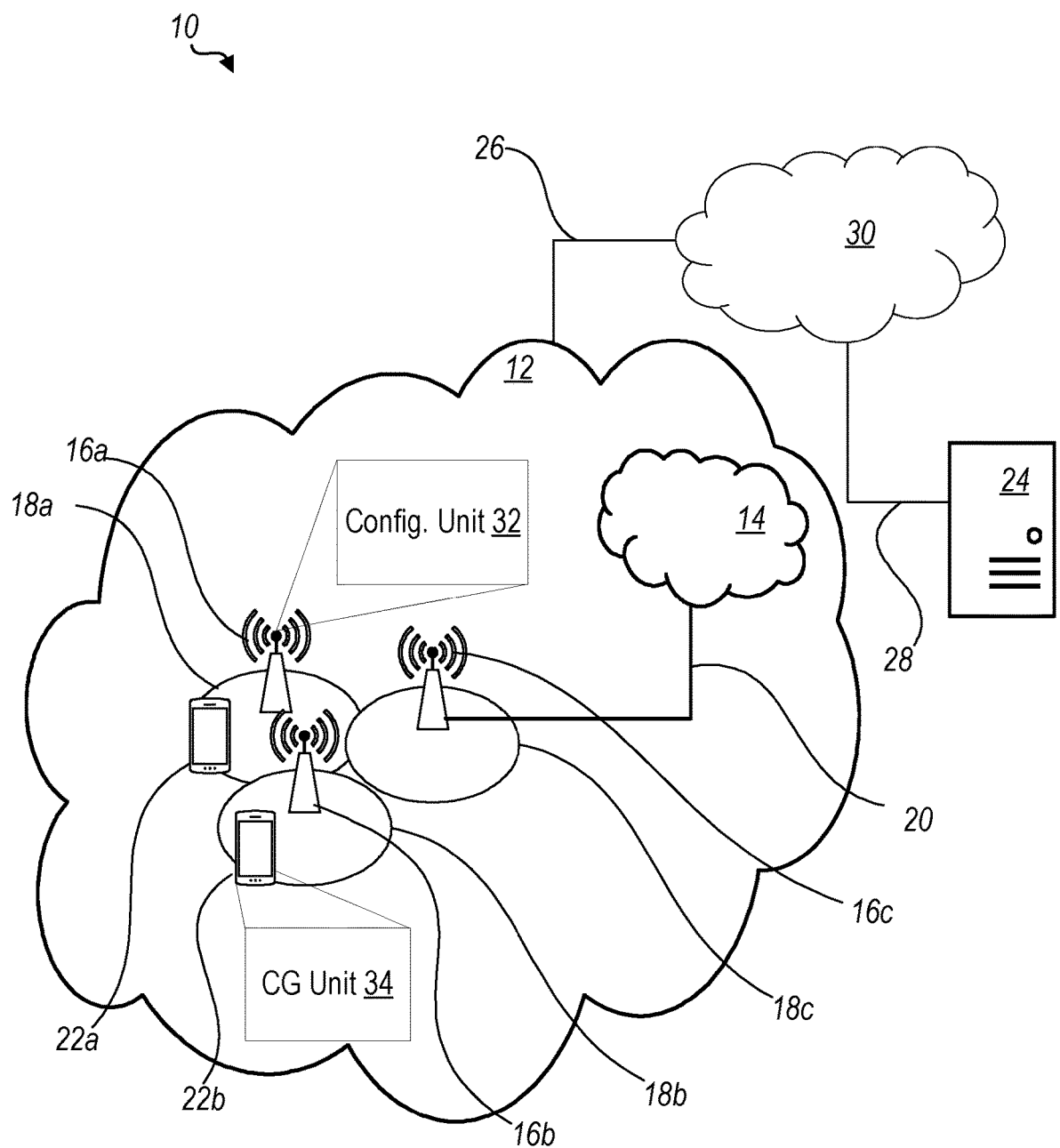
FIG. 5 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

In some embodiments, a network node 16 is configured to include a configuration unit 32 which is configured to configure the WD 22 with at least one configured grant, CG, uplink transmission configuration; and receive signaling based at least in part on the at least one CG uplink transmission configuration. In some embodiments, a network node 16 is configured to include a configuration unit 32 which is configured to configure the WD 22 with configured grant (CG) time resources based at least in part on CG periodicity and a bitmap, the bitmap indicating which time resources are allowed for uplink transmissions from the WD 22; and receive the uplink transmissions from the WD 22 on at least part of the allowed time resources.

In some embodiments, a wireless device 22 is configured to include a CG unit 34 which is configured to obtain at least one configured grant, CG, uplink transmission configuration; and transmit signaling based at least in part on the obtained at least one CG uplink transmission configuration. In some embodiments, a wireless device 22 is configured to include a CG unit 34 which is configured to obtain a configuration of configured grant (CG) time resources based at least in part on CG periodicity and a bitmap, the bitmap indicating which time resources are allowed for uplink transmissions from the WD 22; and transmit the uplink transmissions on at least part of the allowed time resources.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to configure the WD 22 with configured grant (CG) time resources based at least in part on CG periodicity and a bitmap, the bitmap indicating which time resources are allowed for uplink transmissions from the WD 22; and receive the uplink transmissions from the WD 22 on at least part of the allowed time resources.

In some embodiments, the uplink transmissions and/or the CG time resources are for the unlicensed spectrum. In some embodiments, each bit in the bitmap indicates whether CG time resources within a corresponding at least one slot are allowed for the uplink transmissions from the WD 22 in the unlicensed spectrum. In some embodiments, the processing circuitry 68 is further configured to configure the WD 22 by being further configured to one or more of: signal the WD 22 via radio resource control (RRC) and/or downlink control information (DCI); activate and/or deactivate at least a subset of the CG time resources via RRC and/or DCI; configure the WD 22 to, after transmitting uplink according to a first CG configuration, switch to a second CG configuration, different from the first CG configuration; and activate and/or deactivate at least a subset of multiple CG configurations via RRC and/or DCI.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a CG unit 34 configured to obtain a configuration of configured grant (CG) time resources based at least in part on CG periodicity and a bitmap, the bitmap indicating which time resources are allowed for uplink transmissions from the WD 22; and transmit the uplink transmissions on at least part of the allowed time resources.

In some embodiments, the uplink transmissions and/or the CG time resources are for the unlicensed spectrum. In some embodiments, each bit in the bitmap indicates whether CG time resources within a corresponding at least one slot are allowed for the uplink transmissions from the WD 22 in the unlicensed spectrum. In some embodiments, the processing circuitry 84 is further configured to obtain the configuration by being further configured to one or more of: receive signaling via radio resource control (RRC) and/or downlink control information (DCI); receive signaling to activate and/or deactivate at least a subset of the CG time resources via RRC and/or DCI; receive signaling instructing the WD to, after transmitting uplink according to a first CG configuration, switch to a second CG configuration, different from the first CG configuration; and receive signaling to activate and/or deactivate at least a subset of multiple CG configurations via RRC and/or DCI.

Figure 6:
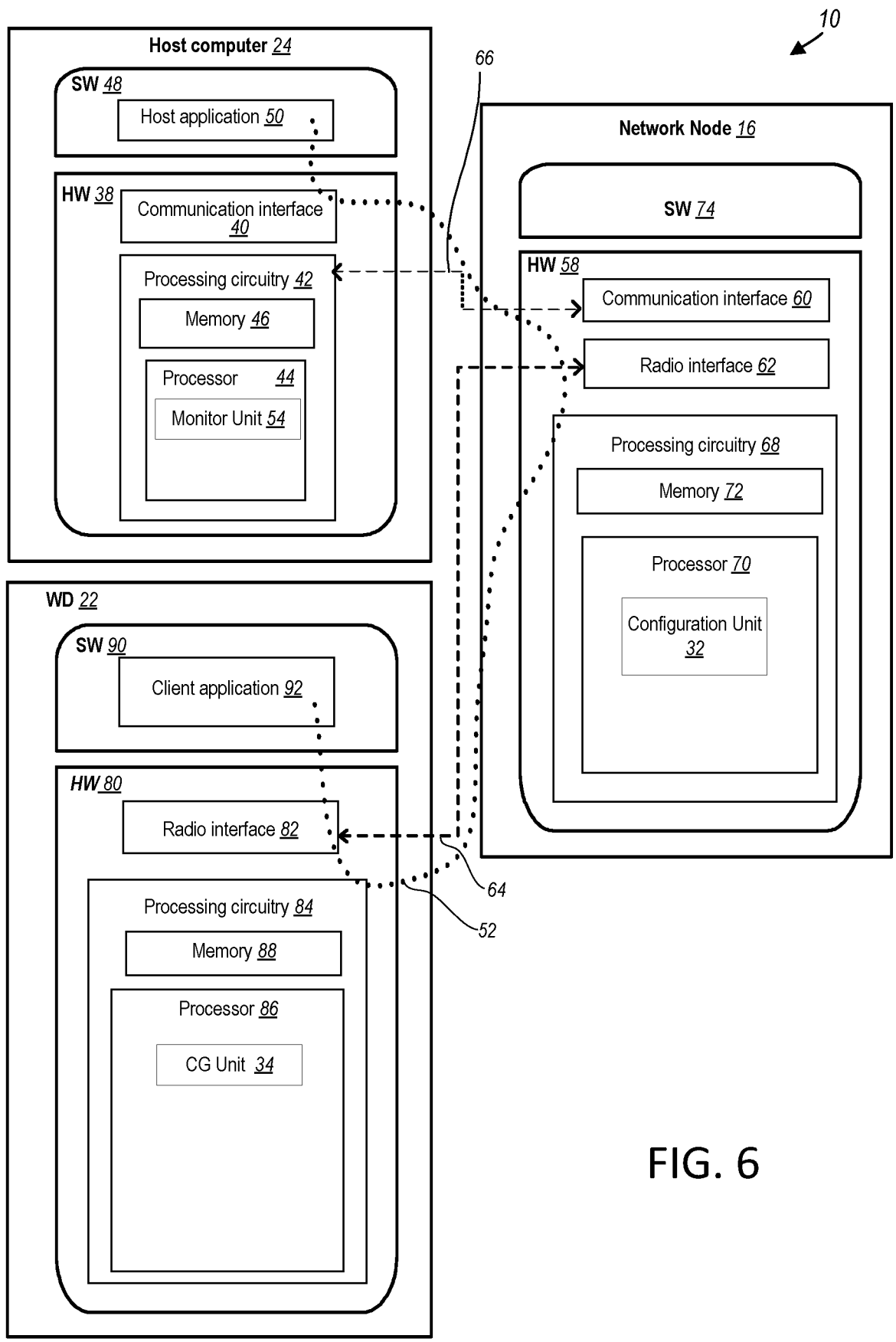
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as configuration unit 32, and CG unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 7 is a flowchart illustrating an exemplary method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 8 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 9:
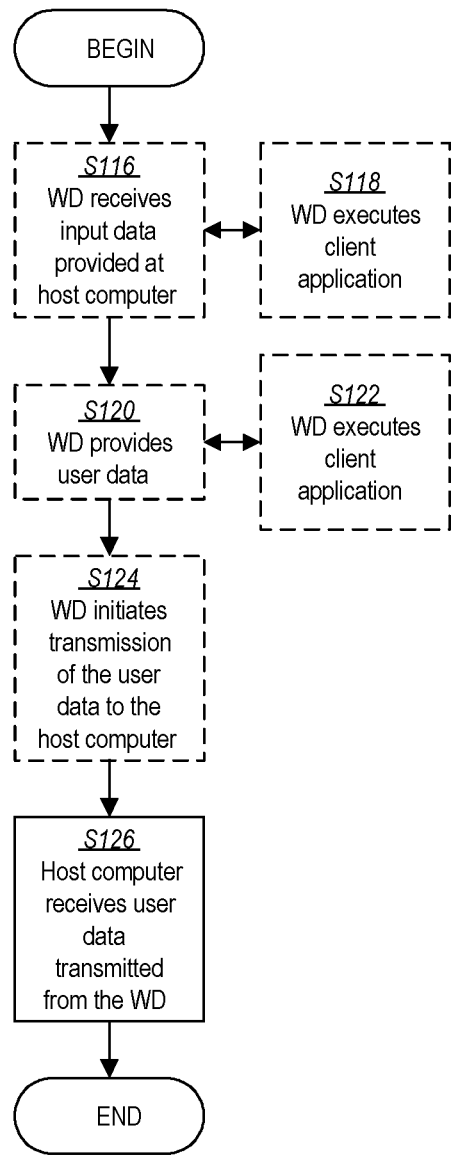
FIG. 9 is a flowchart illustrating exemplary methods implemented in a communication system including a host computer, a network node and a wireless device for receiving user data from the wireless device at a host computer according to some embodiments of the present disclosure.

FIG. 9 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 10:
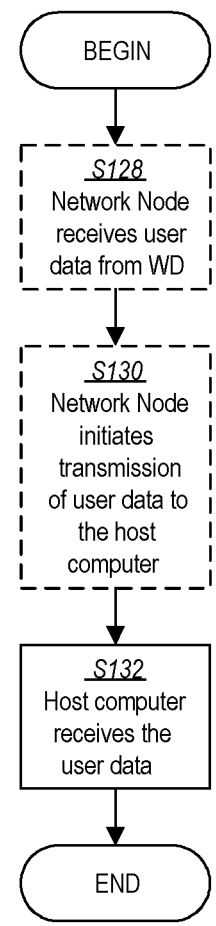
FIG. 10 is a flowchart illustrating exemplary methods implemented in a communication system including a host computer, a network node and a wireless device for receiving user data at a host computer according to some embodiments of the present disclosure.

FIG. 10 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130).

In a third step, the host computer 24 receives the user data carried in the transmission initiated by the network node 16 (Block S132).

Figure 11:
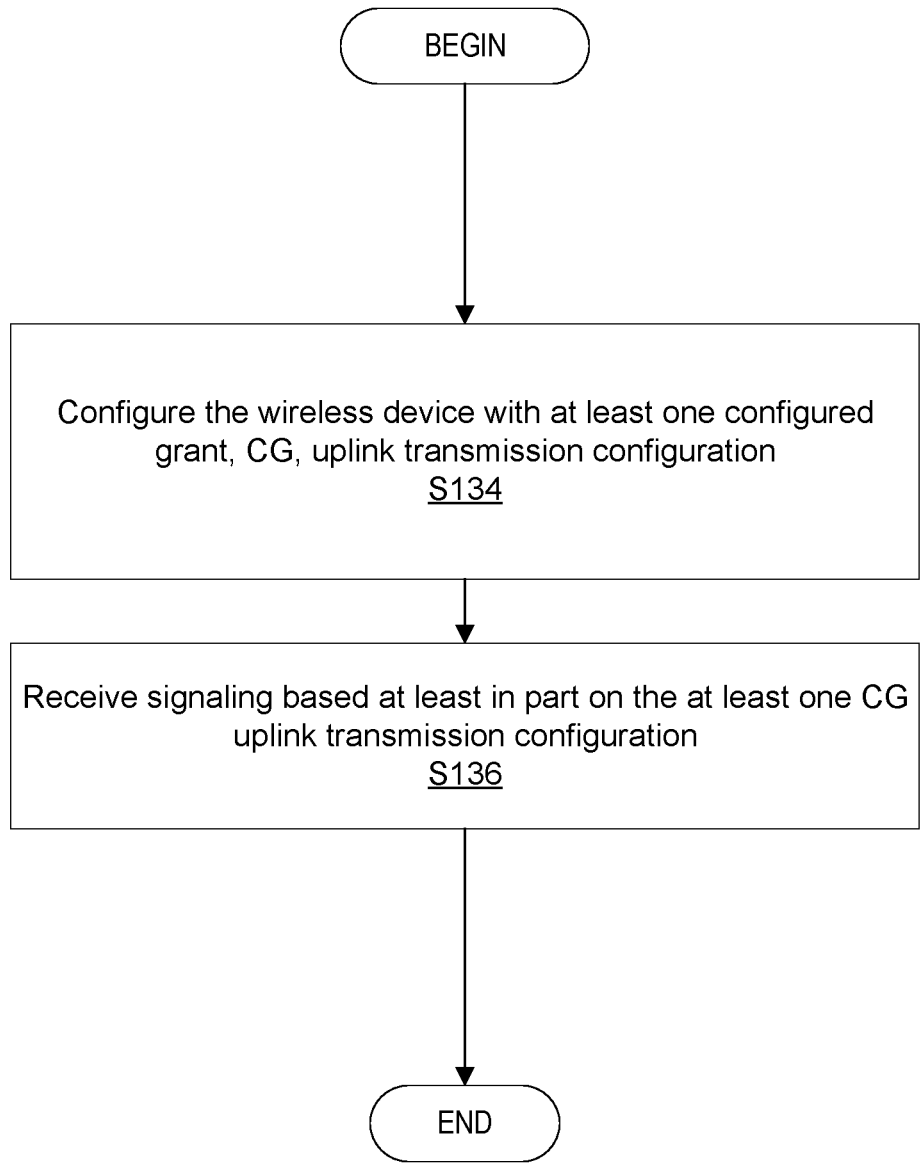
FIG. 11 is a flowchart of an exemplary process in a network node for configuration unit according to some embodiments of the present disclosure.

FIG. 11 is a flowchart of an exemplary process in a network node 16 for time resources for configured UL according to some embodiments of the present disclosure. One or more Blocks and/or functions and/or methods performed by the network node 16 may be performed by one or more elements of network node 16 such as by configuration unit 32 in processing circuitry 68, processor 70, communication interface 60 and/or radio interface 62, etc. according to the example method. The example method includes configuring (Block S134), such as via configuration unit 32, processing circuitry 68, processor 70, communication interface 60 and/or radio interface 62, the WD 22 with at least one configured grant, CG, uplink transmission configuration. The method includes receiving (Block S136), such as via configuration unit 32, processing circuitry 68, processor 70, communication interface 60 and/or radio interface 62, signaling based at least in part on the at least one CG uplink transmission configuration.

In some embodiments, configuring the WD 22 with the at least one CG uplink transmission configuration includes configuring, such as via configuration unit 32, processing circuitry 68, processor 70, communication interface 60 and/or radio interface 62, the WD 22 with multiple CG uplink transmission configurations via radio resource control, RRC, signaling. In some embodiments, the method further includes one of activating and deactivating, such as via configuration unit 32, processing circuitry 68, processor 70, communication interface 60 and/or radio interface 62, at least one of the at least one CG uplink transmission configuration; and receiving, via a medium access control, MAC, control element, CE, a bitmap, the bitmap indicating confirmation of the one of the activating and the deactivating of each of the at least one CG uplink transmission configuration.

In some embodiments, each of the at least one CG uplink transmission configuration corresponds to a bit in the bitmap. In some embodiments, configuring the WD 22 with the at least one CG uplink transmission configuration further includes assigning, such as via configuration unit 32, processing circuitry 68, processor 70, communication interface 60 and/or radio interface 62, an index for each of the at least one CG uplink transmission configuration via radio resource control, RRC, signaling. In some embodiments, the method further includes transmitting, such as via configuration unit 32, processing circuitry 68, processor 70, communication interface 60 and/or radio interface 62, a slot format information, SFI, the SFI indicating at least one time resource as flexible, the at least one time resource indicated as flexible being allowed for an uplink transmission corresponding to the at least one CG uplink transmission configuration. In some embodiments, the method further includes transmitting, such as via configuration unit 32, processing circuitry 68, processor 70, communication interface 60 and/or radio interface 62, signaling instructing the WD 22 to, after transmitting uplink according to a first configuration of the at least one CG uplink transmission configuration, switch to a second configuration of the at least one CG uplink transmission configuration, different from the first configuration of the at least one CG uplink transmission configuration.

In some embodiments, the method includes configuring, such as via configuration unit 32 in processing circuitry 68 and/or radio interface 62, a wireless device (WD) 22 with configured grant (CG) time resources based at least in part on CG periodicity and a bitmap, the bitmap indicating which time resources are allowed for uplink transmissions from the WD 22; and optionally receiving, such as via configuration unit 32 in processing circuitry 68 and/or radio interface 62, the uplink transmissions from the WD 22 on at least part of the allowed time resources.

In some embodiments, the uplink transmissions and/or the CG time resources are for the unlicensed spectrum. In some embodiments, each bit in the bitmap indicates whether CG time resources within a corresponding at least one slot are allowed for the uplink transmissions from the WD in the unlicensed spectrum. In some embodiments, the configuring the WD further comprises one or more of: signaling, such as via configuration unit 32 in processing circuitry 68 and/or radio interface 62, the WD 22 via radio resource control (RRC) and/or downlink control information (DCI); activating and/or deactivating, such as via configuration unit 32 in processing circuitry 68 and/or radio interface 62, at least a subset of the CG time resources via RRC and/or DCI; configuring the WD to, after transmitting uplink according to a first CG configuration, switch to a second CG configuration, different from the first CG configuration; and activating and/or deactivating at least a subset of multiple CG configurations via RRC and/or DCI.

Figure 12:
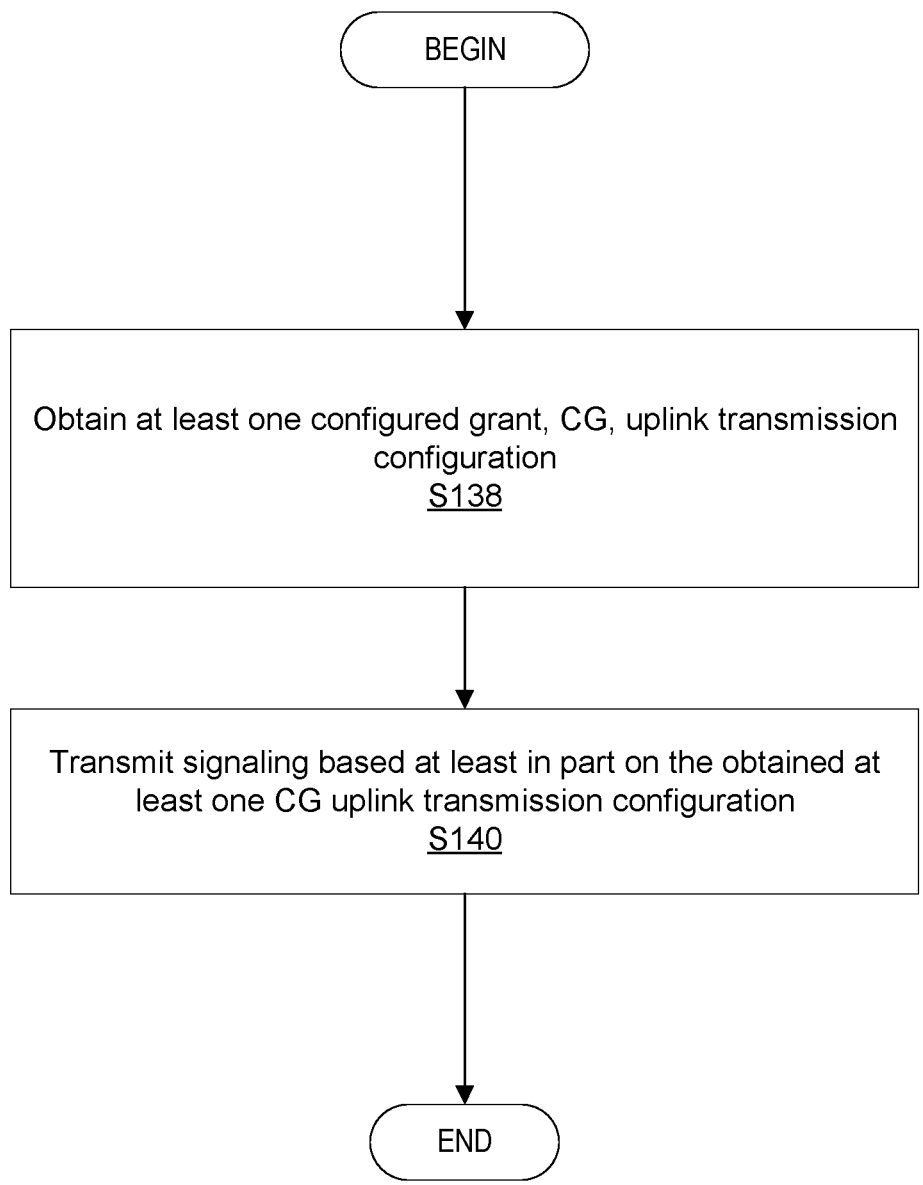
FIG. 12 is a flowchart of an exemplary process in a wireless device for configured grant unit according to some embodiments of the present disclosure.

FIG. 12 is a flowchart of an exemplary process in a wireless device 22 for time resources for configured UL according to some embodiments of the present disclosure. One or more Blocks and/or functions and/or methods performed by WD 22 may be performed by one or more elements of WD 22 such as by CG unit 34 in processing circuitry 84, processor 86, radio interface 82, etc. The example method includes obtaining (Block S138), such as via CG unit 34, processing circuitry 84, processor 86 and/or radio interface 82, at least one configured grant, CG, uplink transmission configuration. The method includes transmitting (Block S140), such as via CG unit 34, processing circuitry 84, processor 86 and/or radio interface 82, signaling based at least in part on the obtained at least one CG uplink transmission configuration.

In some embodiments, obtaining the at least one CG uplink transmission configuration includes obtaining, such as via CG unit 34, processing circuitry 84, processor 86 and/or radio interface 82, multiple CG uplink transmission configurations via radio resource control, RRC, signaling. In some embodiments, the method further includes receiving, such as via CG unit 34, processing circuitry 84, processor 86 and/or radio interface 82, one of an activation and a deactivation of at least one of the at least one CG uplink transmission configuration; and transmitting, via a medium access control, MAC, control element, CE, a bitmap, the bitmap indicating confirmation of the one of the activation and the deactivation of each of the at least one CG uplink transmission configuration.

In some embodiments, each of the at least one CG uplink transmission configuration corresponds to a bit in the bitmap. In some embodiments, obtaining the at least one CG uplink transmission configuration further includes receiving, such as via CG unit 34, processing circuitry 84, processor 86 and/or radio interface 82, an assignment of an index for each of the at least one CG uplink transmission configuration via radio resource control, RRC, signaling. In some embodiments, the method further includes receiving, such as via CG unit 34, processing circuitry 84, processor 86 and/or radio interface 82, a slot format information, SFI, the SFI indicating at least one time resource as flexible, the at least one time resource indicated as flexible being allowed for an uplink transmission corresponding to the at least one CG uplink transmission configuration.

In some embodiments, the method further includes receiving signaling instructing the WD 22 to, after transmitting uplink according to a first configuration of the at least one CG uplink transmission configuration, switch to a second configuration of the at least one CG uplink transmission configuration, different from the first configuration of the at least one CG uplink transmission configuration; and switching between the first and second configurations of the at least one CG uplink transmission configuration according to the received instruction.

In some embodiment, the method includes obtaining, such as via CG unit 34 in processing circuitry 84 and/or radio interface 82, a configuration of configured grant (CG) time resources based at least in part on CG periodicity and a bitmap, the bitmap indicating which time resources are allowed for uplink transmissions from the WD 22; and optionally transmitting, such as via CG unit 34 in processing circuitry 84 and/or radio interface 82, the uplink transmissions on at least part of the allowed time resources.

In some embodiments, the uplink transmissions and/or the CG time resources are for the unlicensed spectrum. In some embodiments, each bit in the bitmap indicates whether CG time resources within a corresponding at least one slot are allowed for the uplink transmissions from the WD 22 in the unlicensed spectrum. In some embodiments, the obtaining the configuration further comprises one or more of: receiving signaling via radio resource control (RRC) and/or downlink control information (DCI); receiving signaling, such as via CG unit 34 in processing circuitry 84 and/or radio interface 82, to activate and/or deactivate at least a subset of the CG time resources via RRC and/or DCI; receiving signaling instructing the WD 22 to, after transmitting uplink according to a first CG configuration, switch to a second CG configuration, different from the first CG configuration; and receiving signaling to activate and/or deactivate at least a subset of multiple CG configurations via RRC and/or DCI.

Having generally described some embodiments of the present disclosure for NRU configured UL, a more detailed description of some of the embodiments are described below.

Embodiment for Slots Allowed for Configured UL Grants

Embodiment 1

Figure 13:
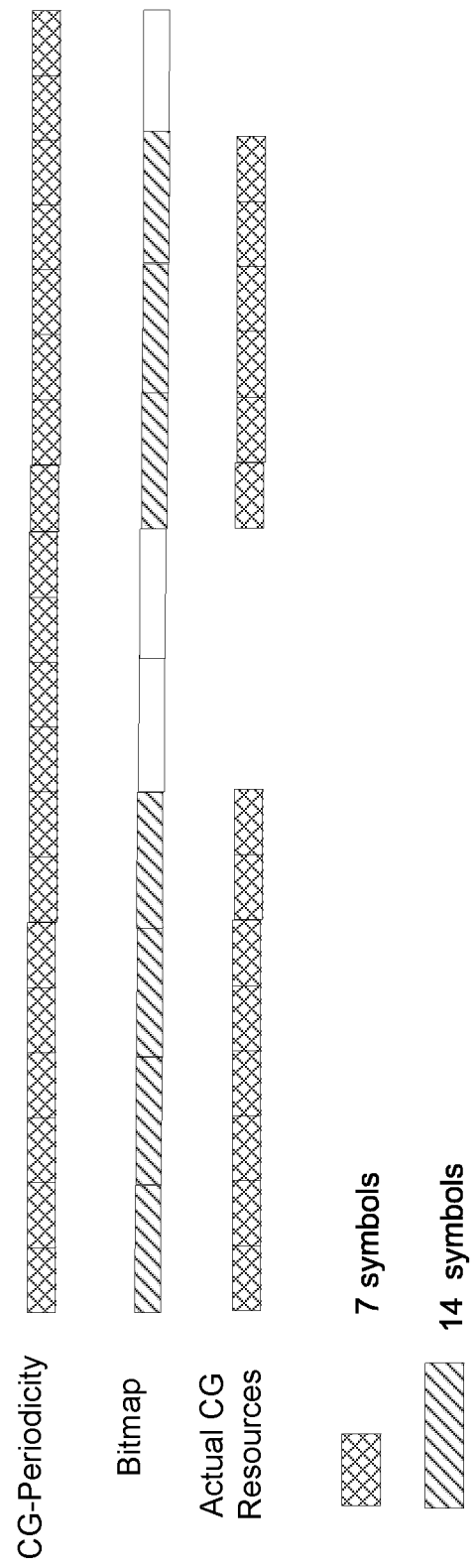
FIG. 13 illustrates an example of CG-time resources indicated based on both CG periodicity and bitmap according to some embodiments of the present disclosure.

In one embodiment, a bit map can be used on top of existing NR CG-Periodicity. It may complement 3GPP NR rel-15 behavior. The WD 22 may be allowed to send e.g., UL on CG resources according to the configured periodicity only if the bitmap indicates that CG resources in that slot are allowed. FIG. 13 shows an example where the WD 22 is configured with a periodicity of 7 symbols, and timeDomainAllocation that indicates S=0, L=7 (OFDM symbols (OS)). FIG. 13 illustrates an example bitmap of 10 bits indicating (1,1,1,1,0,0,1,1,1,0), where the bitmap uses units of 1 slot (=14 OS) per bit (or 2 CG periods per slot). The length-10 bitmap uses SFN=0 as a starting point. The combination of CG-Periodicity (with periodicity=2 or 7 OS), timeDomainAllocation, and the bitmap may provide the flexibility to enable multiple starting positions within a slot, while still being able to exclude certain slots from being used for CG transmissions.

FIG. 13 illustrates an example of CG-time resources based on both CG-Periodicity and Bitmap, where CG-Periodicity=7 OS, Bitmap unit=1 slot (=14 OS). Duration of the bitmap in this example is equal to 20 CG periods. The given bitmap example allows 14 periods (as shown in the "Actual CG Resources" grid column) to be usable for starting an UL CG transmission, and prevents 6 periods (as shown in the gap area in the "Actual CG Resources" grid column) from being used for UL CG. Thus, in some embodiments, the bitmap as well as the CG-Periodicity can be used to indicate CG-time resources available to the WD 22 for configured grant (CG) UL transmissions.

In a further embodiment, the resolution of the bitmap can be defined to be larger or smaller than a slot duration. As one nonlimiting example, the resolution can be set to be the same as the duration of the timeDomainAllocation of the configured grant. For example, for a configured grant with 7 OS duration and periodicity of every 7 OS, a bitmap of 20 bits may be used to fully configure the availability of said configured grant transmission opportunities within 10 slots.

In yet another embodiment, the span of the bitmap can be set to be longer or shorter than 10 slots. As one nonlimiting exemplary embodiment, the span of the bitmap is determined by the transmission periodicity of the discovery signal. In another nonlimiting example, the span of the bitmap is determined by the periodicity of the synchronization signal block (SSB) transmission opportunities.

Embodiment 1.1: Configured UL Grants with Repetition

Figure 14:
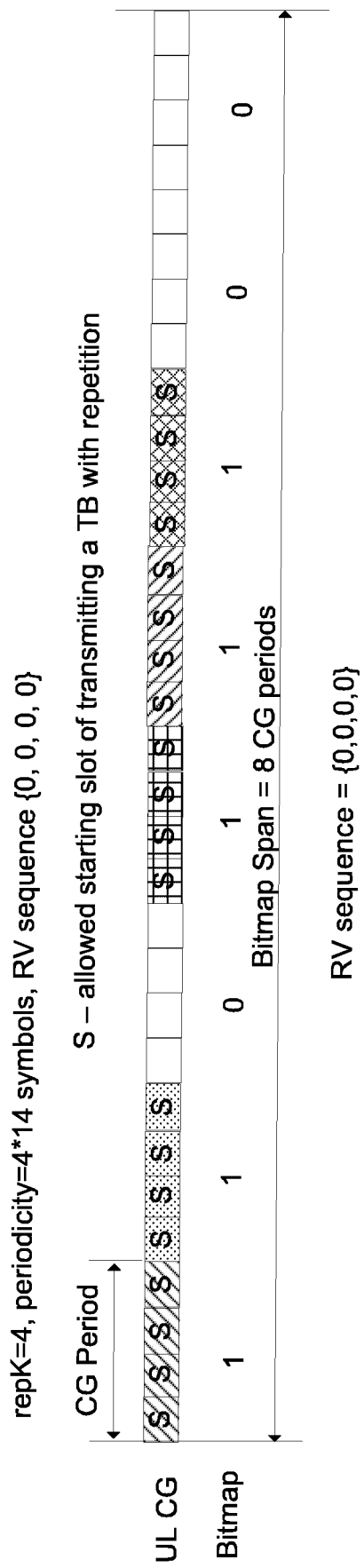
FIG. 14 illustrates examples of transmission of a TB with repetition according to RV sequences {0, 0, 0, 0}, according to some embodiments of the present disclosure.

In yet another embodiment, UL CG with TB repetition is supported for NR-U. UL CG periodicity is preferably equal to repK slots, where repK is an integer and repK>=1. The bitmap can be defined with a unit of CG periodicity. In Rel-15, the allowed repK values may be: {1, 2, 4, 8}. In some embodiments, where a WD 22 can start the transmission of a TB may be further limited by RV associated with a slot. For example, a WD 22 is allowed to transmit at any slot associated with RV=0. For example, if RV sequence of {0, 0, 0, 0} is defined, the WD 22 is allowed to start transmitting a TB at any of the first repK slot, starting from the periodicity boundary. This is illustrated in FIG. 14. Similarly, FIGS. 15 and 16 illustrate the allowed starting slots of a TB when RV sequences of {0, 3, 0, 3} and {0, 2, 3, 1} are used, respectively.

Figure 15:
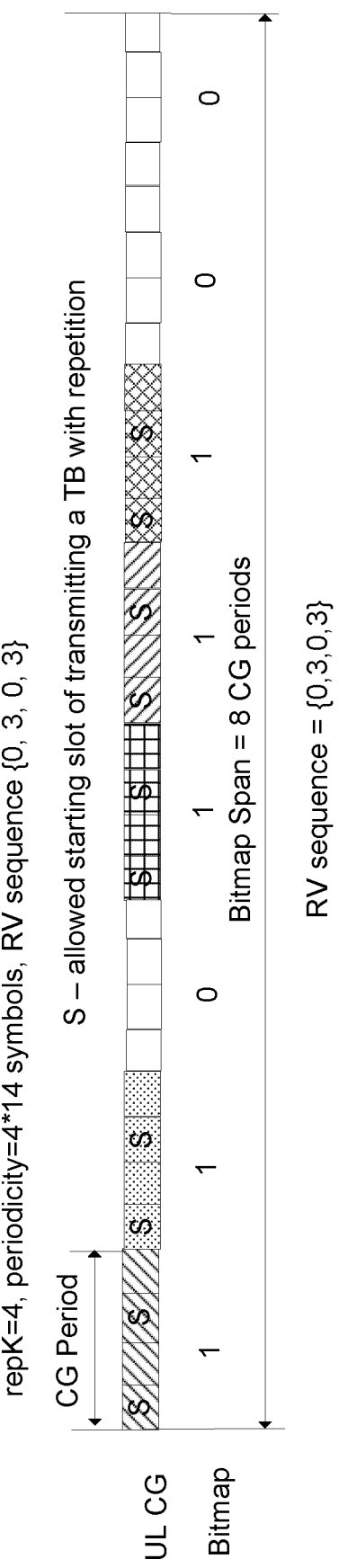
FIG. 15 illustrates examples of transmission of a TB with repetition according to RV sequences {0, 3, 0, 3}, according to some embodiments of the present disclosure.
Figure 16:
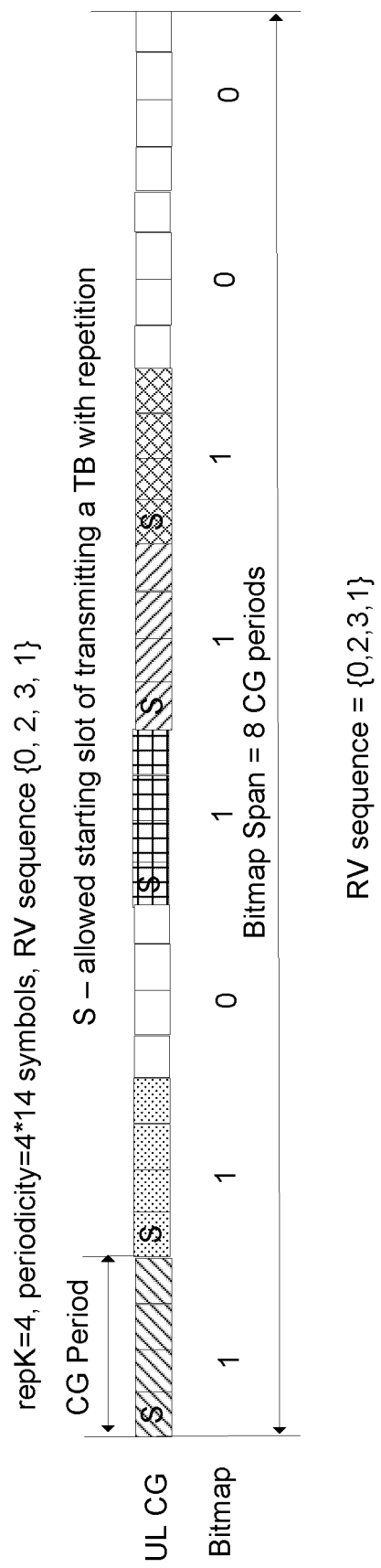
FIG. 16 illustrates examples of transmission of a TB with repetition according to RV sequences {0, 2, 3, 1}, according to some embodiments of the present disclosure.

FIGS. 14-16 illustrate an example of UL CG with repetition of a TB, when CG periodicity=repK slots, where repK=4 (slots), UL CG period=4*14 symbols (i.e., 4 slots), and bitmap spans 8 UL CG periods (where each UL CG period in this example corresponds to 4 slots, where e.g., a TB is repeated in each of the 4 slots). Slots with the same shading are used to indicate transmission of a same TB with repetition. Blank slots are not for UL CG transmission of the given WD 22.

While UL CG periodicity may be equal to repK slots in some embodiments, so that slots in adjacent periods can be used for PUSCH transmission, it may also be also possible to use CG periodicity greater than repK slots. With periodicity >repK slots, there may be slots within each period that are not usable by the given WD 22, but these slots can be used by another WD 22 to allow time-domain multiplexing of different WDs' 22 PUSCH transmission.

Figure 17:
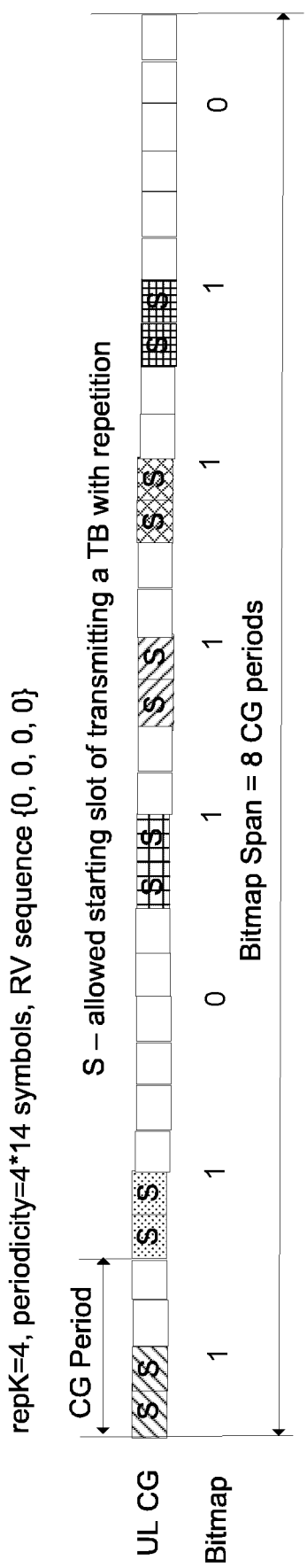
FIG. 17 illustrates an example of UL CG with repetition of a TB, according to some embodiments of the present disclosure.

Thus, FIG. 17 illustrates an example of UL CG with repetition of a TB, when CG periodicity >repK slots, where repK=2 (slots), UL CG period=4*14 symbols (i.e., 4 slots), bitmap spans 8 UL CG period(s). Slots with the same shading are used to indicate transmission of a same TB with repetition. Blank slots are not for UL CG transmission of the given WD 22.

Embodiment 1.2: Implicit Bitmaps for Configured Grant Resources

In this embodiment, configured grants may be implicitly disallowed in certain slots or symbols.

In one non-limiting exemplary embodiment, configured grants are not allowed in slots that are part of a DRS Measurement Timing Configuration (DMTC) where the DRS (discovery reference signals) may be transmitted.

In another embodiment, configured grants may be not allowed in DL or Flexible slots as indicated by the slot format information (SFI) in group common signaling such as a PDCCH associated with a group common Radio Network Temporary Identifier (RNTI). That is, the SFI may be used as a bitmap on the configured grant opportunities. In another variation, both Flexible and UL slots could be allowed for configured grants. For example, indicators on whether or not a flexible time resource is allowed for configured grants may be in RRC signaling. In other embodiments, indicators on whether a flexible time resource is allowed for configured grants may be carried via PDCCH. In yet other embodiments, indicators on whether a flexible time resource is allowed for configured grants may be carried via other signaling such as MAC CE. In another variation, the slot format can be provided on other signaling than SFI.

Embodiment 2

Having multiple PUSCHs within every slot significantly can increase the overhead (e.g., DMRS and uplink control information (UCI)). Therefore, there may be provided a way in which the CG-WD 22 can switch to slot-based transmissions after grabbing or accessing the channel e.g., in the unlicensed spectrum.

Multiple active configured grant configuration can be used to allow the WD 22 to switch to slot-based transmissions after initiating the COT to minimize DMRS and UCI overhead. For example, the network node 16 (e.g., gNB) can activate two separate configurations for a WD 22.

Configuration 1: Periodicity of 14 slots, and timeDomainAllocation indicates S=0, L=14 (i.e., PUSCH expand the full slot); and/or Configuration 2: Periodicity of 7 slots, the timeDomainAllocation indicates S=0, L=7.

The WD 22 can attempt to transmit using configuration 2. If succeeded, the WD 22 may switch to slot-based transmissions according to configuration 1. In one embodiment, the WD 22 may have multiple configurations but only one of them is allowed to be active at any time. The selection of the configuration that is active can be signaled using the methods described in the previous embodiments. In one non-limiting embodiment, the selection of the active configuration is performed implicitly.

In another embodiment, the WD 22 is configured a number of symbols after starting transmissions using a first configuration when it should switch from a first to a second configuration if it is continuing to transmit. In a variation of this embodiment, the number of symbols after which the configuration is switched may be pre-determined and does not have to be configured to the WD 22. In another embodiment, the WD 22 may switch from a second configuration back to a first configuration once it stops transmissions.

In another embodiment, the WD 22 may determine based on information in group common signaling whether the UL transmission is within a network node-initiated channel occupancy time (COT) or not. The WD 22 uses one configuration for configured grant transmissions if the transmission is within such a COT and another configuration otherwise.

Embodiment 3: Activation/Deactivation of Multiple Configurations

Activation/Deactivation

The CG time resources of different configuration may fully or partially overlap.

For Type 2 CG configurations, the network node 16 may activate/deactivate each configuration separately:
  for example, each CG configuration is assigned an index. The index is indicated in the activation/deactivation DCI.

Alternatively, the network node 16 can activate/deactivate multiple configuration at once, in this case.

The CG time resources may be semi-statically configured (e.g., RRC), which may include all or subset of the following parameters:
  CG periodicity
  CG bitmap
  timeDomainAllocation
  timeDomainOffset.

In addition, each configuration may be assigned an index semi-statically. Activation of multiple configuration can be indicated using one activation DCI. As a non-limiting example, the DCI includes a bitmap, each bit maps to one of the configurations. The network node 16 sets the corresponding bit to 1 when the network wants to activate a certain configuration.

Activation of multiple configurations can be indicated using one deactivation DCI. As a non-limiting example, the network node 16 sets the corresponding bit to certain value (either 0 or 1) when the network wants to deactivate a certain configuration.

In some embodiments, the network node 16 may overwrite the semi-statically configured CG time resources by e.g., sending DCI activation corresponding to that configuration (bitmap set to all 0 except the bit corresponding to that configuration) with updated fields for timeDomainAllocation.

Mac Confirmation:

The WD 22 can confirm the activated/deactivated of multiple configuration using one MAC CE. The MAC CE may include one activation/deactivation bit for each configuration. The WD 22 may report the status of all the configurations in one MAC CE (e.g., 1 indicates configuration active, 0 indicates configuration deactivated).

If an activation or deactivation occurred in multiple serving cells, the WD 22 may have several options to confirm the activation/deactivation.

In the first option, the MAC CE may carry a cell or carrier index indicating the cell/carrier which has been performed activation or deactivation. After the carrier/cell index, the MAC CE can contain a bitmap containing bits for all configurations in that cell, each bit corresponds to a configuration. The bit with value 1 means the corresponding configuration active, while the bit with value 0 means the corresponding configuration deactivated. In another example, the MAC CE may contain one or multiple absolute configuration indices which mean the configurations that have been activated/deactivated.

Figure 18:
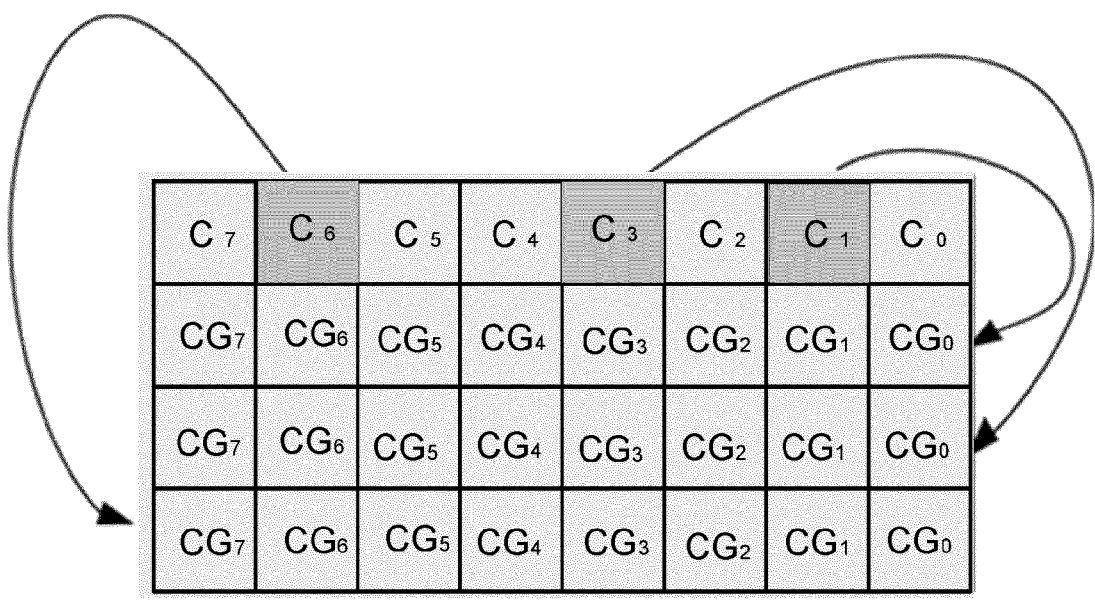
FIG. 18 illustrates an example of activation/deactivation for three cells via bitmap fields according to some embodiments of the present disclosure.

As a second option, the MAC CE may contain one bitmap field to indicate cells/carriers that have been performed activation/deactivation of configured grant configurations. Each serving cell has one corresponding bit in the field, the value 1 indicates the corresponding cell has performed activation/deactivation action of configured grant configurations, while the value 0 indicates the corresponding cell has not performed activation/deactivation action of configured grant configurations. Each bit with value 1 also indicates that there is one bitmap field present for CG configurations of the corresponding cell after the cell/carrier bitmap field. In the bitmap field for CG configurations of a cell, each bit may correspond to a CG configuration. The value 1 may indicate the corresponding configuration active, while the bit with value 0 may indicate the corresponding configuration deactivated. An example of the second option is shown in FIG. 18.

In this example, there are 3 serving cells that have performed activation/deactivation (indicated by $C_6$, $C_3$ and $C_1$), for these three cells, there are three bitmap fields present for the corresponding cells. In each bitmap, there are up to 8 CG configurations configured.

In another example, some R bits may be reserved in the MAC CE for octet alignment purposes.

Embodiment 4: Deactivation Via Group Common Signaling

The configured grant design may be beneficial in reducing latency for unlicensed band operations in low loads. When traffic loads rise, the network node 16 can selectively deactivate some WDs 22 to ensure ordering operation of the network. However, if large UL traffic simultaneously arrives at many WDs 22 with configured grants, it may be beneficial to enable the network node 16 to deactivate a group of WDs 22 quickly. This can be accomplished, for example, via a group common downlink signaling. In one nonlimiting exemplary embodiment, this is implemented with PDCCH associated with a group common RNTI. In another nonlimiting exemplary embodiment, the deactivation can be signaled via transmitting a sequence known to said group of WDs 22 in the downlink.

In yet another embodiment, a WD 22 ceases uplink transmission with configured grant resources. The WD 22 can request scheduling in the next available PUCCH opportunity or PRACH opportunity. In a further embodiment, the WD 22 does not perform any confirmation of group common deactivation.

In addition, some embodiments may include one or more of the following:

Embodiment A1. A network node configured to communicate with a wireless device (WD), the network node configured to, and/or comprising a radio interface and/or comprising processing circuitry configured to:
  configure the WD with configured grant (CG) time resources based at least in part on CG periodicity and a bitmap, the bitmap indicating which time resources are allowed for uplink transmissions from the WD; and
  optionally receive the uplink transmissions from the WD on at least part of the allowed time resources.

Embodiment A2. The network node of Embodiment A1, wherein the uplink transmissions and/or the CG time resources are for the unlicensed spectrum.

Embodiment A3. The network node of any one of Embodiments A1 and A2, wherein each bit in the bitmap indicates whether CG time resources within a corresponding at least one slot are allowed for the uplink transmissions from the WD in the unlicensed spectrum.

Embodiment A4. The network node of any one of Embodiments A1-A3, wherein the processing circuitry is further configured to configure the WD by being further configured to one or more of:

signal the WD via radio resource control (RRC) and/or downlink control information (DCI);

activate and/or deactivate at least a subset of the CG time resources via RRC and/or DCI;

configure the WD to, after transmitting uplink according to a first CG configuration, switch to a second CG configuration, different from the first CG configuration; and activate and/or deactivate at least a subset of multiple CG configurations via RRC and/or DCI.

Embodiment B1. A method implemented in a network node, the method comprising:

configuring a wireless device (WD) with configured grant (CG) time resources based at least in part on CG periodicity and a bitmap, the bitmap indicating which time resources are allowed for uplink transmissions from the WD; and optionally receiving the uplink transmissions from the WD on at least part of the allowed time resources.

Embodiment B2. The method of Embodiment B1, wherein the uplink transmissions and/or the CG time resources are for the unlicensed spectrum.

Embodiment B3. The method of any one of Embodiments B1 and B2, wherein each bit in the bitmap indicates whether CG time resources within a corresponding at least one slot are allowed for the uplink transmissions from the WD in the unlicensed spectrum.

Embodiment B4. The method of any one of Embodiments B1-B3, wherein the configuring the WD further comprises one or more of:

signaling the WD via radio resource control (RRC) and/or downlink control information (DCI);

activating and/or deactivating at least a subset of the CG time resources via RRC and/or DCI;

configuring the WD to, after transmitting uplink according to a first CG configuration, switch to a second CG configuration, different from the first CG configuration; and activating and/or deactivating at least a subset of multiple CG configurations via RRC and/or DCI.

Embodiment C1. A wireless device (WD) configured to communicate with a network node, the WD configured to, and/or comprising a radio interface and/or processing circuitry configured to:

obtain a configuration of configured grant (CG) time resources based at least in part on CG periodicity and a bitmap, the bitmap indicating which time resources are allowed for uplink transmissions from the WD; and optionally transmit the uplink transmissions on at least part of the allowed time resources.

Embodiment C2. The WD of Embodiment C1, wherein the uplink transmissions and/or the CG time resources are for the unlicensed spectrum.

Embodiment C3. The WD of any one of Embodiments C1 and C2, wherein each bit in the bitmap indicates whether CG time resources within a corresponding at least one slot are allowed for the uplink transmissions from the WD in the unlicensed spectrum.

Embodiment C4. The WD of any one of Embodiments C1-C3, wherein the processing circuitry is further configured to obtain the configuration by being further configured to one or more of:

receive signaling via radio resource control (RRC) and/or downlink control information (DCI);

receive signaling to activate and/or deactivate at least a subset of the CG time resources via RRC and/or DCI;

receive signaling instructing the WD to, after transmitting uplink according to a first CG configuration, switch to a second CG configuration, different from the first CG configuration; and receive signaling to activate and/or deactivate at least a subset of multiple CG configurations via RRC and/or DCI.

Embodiment D1. A method implemented in a wireless device (WD), the method comprising:

obtaining a configuration of configured grant (CG) time resources based at least in part on CG periodicity and a bitmap, the bitmap indicating which time resources are allowed for uplink transmissions from the WD; and optionally transmitting the uplink transmissions on at least part of the allowed time resources.

Embodiment D2. The method of Embodiment D1, wherein the uplink transmissions and/or the CG time resources are for the unlicensed spectrum.

Embodiment D3. The method of any one of Embodiments D1 and D2, wherein each bit in the bitmap indicates whether CG time resources within a corresponding at least one slot are allowed for the uplink transmissions from the WD in the unlicensed spectrum.

Embodiment D4. The method of any one of Embodiments D1-D3, wherein the obtaining the configuration further comprises one or more of:

receiving signaling via radio resource control (RRC) and/or downlink control information (DCI);

receiving signaling to activate and/or deactivate at least a subset of the CG time resources via RRC and/or DCI;

receiving signaling instructing the WD to, after transmitting uplink according to a first CG configuration, switch to a second CG configuration, different from the first CG configuration; and receiving signaling to activate and/or deactivate at least a subset of multiple CG configurations via RRC and/or DCI.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Description |
| --- | --- |
| ACK/NACK | Acknowledgment/Not-acknowledgment |
| BSR | Buffer Status Report |
| COT | Channel occupancy time |
| CSI | Channel State Information |

-continued

| Abbreviation | Description |
| --- | --- |
| DCI | Downlink Control Information |
| DFTS-OFDM | Discrete Fourier Transform Spread OFDM |
| DM-RS | Demodulation Reference Signal |
| LBT | Listen before talk |
| LCG | Logical Channel Group |
| LCID | Logical Channel ID |
| PRS | Paging reference symbol |
| PUCCH | Physical Uplink Control Channel |
| QCI | QoS Class Identifier |
| RACH | Random Access Channel |
| PUSCH | Physical Uplink Shared Channel |
| TRS | Tracking reference symbol |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, configured to communicate with a network node, the method comprising:
 obtaining a plurality of configured grant, CG, uplink transmission configurations for a serving cell;
 transmitting signaling based at least in part on the obtained plurality of CG uplink transmission configurations;
 receiving one of an activation and a deactivation of at least one of the plurality of CG uplink transmission configurations; and
 transmitting, via a medium access control, MAC, control element, CE, a bitmap, the bitmap indicating confirmation of the one of the activation and the deactivation of each of the plurality of CG uplink transmission configurations for the serving cell.

2. The method of claim 1, wherein obtaining the a plurality of CG uplink transmission configurations comprises:
 obtaining multiple CG uplink transmission configurations via radio resource control, RRC, signaling.

3. The method of claim 1, wherein each of the a plurality of CG uplink transmission configurations corresponds to a bit in the bitmap.

4. The method of claim 1, wherein obtaining the a plurality of CG uplink transmission configurations further comprises:
 receiving an assignment of an index for each of the a plurality of CG uplink transmission configurations via radio resource control, RRC, signaling.

5. The method of claim 1, further comprising:
 receiving a slot format information, SFI, the SFI indicating at least one time resource as flexible, the at least one time resource indicated as flexible being allowed for an uplink transmission corresponding to the a plurality of CG uplink transmission configurations.

6. The method of claim 1, further comprising:
 receiving signaling instructing the WD to, after transmitting uplink according to a first configuration of the a plurality of CG uplink transmission configurations, switch to a second configuration of the a plurality of CG uplink transmission configurations, different from the first configuration of the a plurality of CG uplink transmission configurations; and switching between the first and second configurations of the a plurality of CG uplink transmission configurations according to the received instruction.

7. A method implemented in a network node configured to communicate with a wireless device, WD, the method comprising:

configuring the WD with a plurality of configured grant, CG, uplink transmission configurations for a serving cell;

receiving signaling based at least in part on the plurality of CG uplink transmission configurations;

one of activating and deactivating at least one of the plurality of CG uplink transmission configurations; and receiving, via a medium access control, MAC, control element, CE, a bitmap, the bitmap indicating confirmation of the one of the activating and the deactivating of each of the plurality of CG uplink transmission configurations for the serving cell.

8. The method of claim 7, wherein configuring the WD with the plurality of CG uplink transmission configurations comprises:

configuring the WD with multiple CG uplink transmission configurations via radio resource control, RRC, signaling.

9. The method of claim 8, wherein each of the plurality of CG uplink transmission configurations corresponds to a bit in the bitmap.

10. The method of claim 7, wherein configuring the WD with the plurality of CG uplink transmission configurations further comprises:

assigning an index for each of the plurality of CG uplink transmission configurations via radio resource control, RRC, signaling.

11. The method of claim 7, further comprising:

transmitting a slot format information, SFI, the SFI indicating at least one time resource as flexible, the at least one time resource indicated as flexible being allowed for an uplink transmission corresponding to the plurality of CG uplink transmission configurations.

12. The method of claim 7, further comprising:

transmitting signaling instructing the WD to, after transmitting uplink according to a first configuration of the plurality of CG uplink transmission configurations, switch to a second configuration of the plurality of CG uplink transmission configurations, different from the first configuration of the plurality of CG uplink transmission configurations.

13. A wireless device, WD, configured to communicate with a network node, the wireless device comprising processing circuitry configured to cause the wireless device to:

obtain a plurality of configured grant, CG, uplink transmission configurations for a serving cell;

transmit signaling based at least in part on the obtained plurality of CG uplink transmission configurations;

receive one of an activation and a deactivation of at least one of the plurality of CG uplink transmission configurations; and transmit, via a medium access control, MAC, control element, CE, a bitmap, the bitmap indicating confirmation of the one of the activation and the deactivation of each of the plurality of CG uplink transmission configurations for the serving cell.

14. The wireless device of claim 13, wherein the processing circuitry is configured to cause the wireless device to obtain the plurality of CG uplink transmission configurations by being configured to cause the wireless device to:

obtain multiple CG uplink transmission configurations via radio resource control, RRC, signaling.

15. The wireless device of claim 13, wherein each of the plurality of CG uplink transmission configurations corresponds to a bit in the bitmap.

16. The wireless device of claim 13, wherein the processing circuitry is further configured to cause the wireless device to obtain the plurality of CG uplink transmission configurations by being configured to cause the wireless device to:

receive an assignment of an index for each of the plurality of CG uplink transmission configurations via radio resource control, RRC, signaling.

17. The wireless device of claim 13, wherein the processing circuitry is further configured to cause the wireless device to:

receive a slot format information, SFI, the SFI indicating at least one time resource as flexible, the at least one time resource indicated as flexible being allowed for an uplink transmission corresponding to the plurality of CG uplink transmission configurations.

18. The wireless device of claim 13, wherein the processing circuitry is further configured to cause the wireless device to:

receive signaling instructing the WD to, after transmitting uplink according to a first configuration of the plurality of CG uplink transmission configurations, switch to a second configuration of the plurality of CG uplink transmission configurations, different from the first configuration of the plurality of CG uplink transmission configurations; and switch between the first and second configurations of the plurality of CG uplink transmission configurations according to the received instruction.

19. A network node configured to communicate with a wireless device, WD, the network node comprising processing circuitry, the processing circuitry configured to cause the network node to:

configure the WD with a plurality of configured grant, CG, uplink transmission configurations for a serving cell;

receive signaling based at least in part on the plurality of CG uplink transmission configurations;

one of activate and deactivate at least one of the plurality of CG uplink transmission configurations; and receive, via a medium access control, MAC, control element, CE, a bitmap, the bitmap indicating confirmation of the one of the activating and the deactivating of each of the plurality of CG uplink transmission configurations for the serving cell.

* * * * *